(12) United States Patent
Madaus et al.

(10) Patent No.: US 10,780,672 B2
(45) Date of Patent: Sep. 22, 2020

(54) LOCALIZED PANEL STIFFENER

(71) Applicant: Zephyros, Inc., Romeo, MI (US)

(72) Inventors: Keith Madaus, Richmond, MI (US);
David Kosal, Richmond, MI (US);
Dean Quaderer, Livonia, MI (US);
Mark Coldren, West Bloomfield, MI (US)

(73) Assignee: Zephyros, Inc., Romeo, MI (US)

( * ) Notice: Subject to any disclaimer, the term of this patent is extended or adjusted under 35 U.S.C. 154(b) by 95 days.

(21) Appl. No.: 15/573,334

(22) PCT Filed: May 16, 2016

(86) PCT No.: PCT/US2016/032710
§ 371 (c)(1),
(2) Date: Nov. 10, 2017

(87) PCT Pub. No.: WO2016/183580
PCT Pub. Date: Nov. 17, 2016

(65) Prior Publication Data
US 2018/0111351 A1     Apr. 26, 2018

Related U.S. Application Data

(60) Provisional application No. 62/161,523, filed on May 14, 2015, provisional application No. 62/164,224, filed on May 20, 2015.

(51) Int. Cl.
*B32B 7/12* (2006.01)
*B32B 7/02* (2019.01)
(Continued)

(52) U.S. Cl.
CPC ............... *B32B 7/02* (2013.01); *B29C 65/02* (2013.01); *B29C 65/1406* (2013.01);
(Continued)

(58) Field of Classification Search
CPC ..... Y10T 428/24826; Y10T 428/24843; B32B 7/12
See application file for complete search history.

(56) References Cited

U.S. PATENT DOCUMENTS 4,369,608 A    1/1983   Miura et al.
4,378,395 A    3/1983   Asoshina et al.
(Continued)

FOREIGN PATENT DOCUMENTS

CN    101289017 A    10/2008
CN    103201108 A     7/2013
(Continued)

OTHER PUBLICATIONS

PCT Search Report & Written Opinion dated Aug. 22, 2016; Application No. PCT/US2016/032710.
(Continued)

*Primary Examiner* — William P Watkins, III
(74) *Attorney, Agent, or Firm* — The Dobrusin Law Firm, P.C.

(57) ABSTRACT

A device (10) comprising a carrier material (14) and a matrix material (12) deposited onto the carrier material in a pattern that leaves a predetermined amount of space (18) between each deposition of matrix material.

20 Claims, 3 Drawing Sheets

(51) Int. Cl.

| | | |
|---|---|---|
| *B32B 5/02* | (2006.01) | |
| *B32B 7/14* | (2006.01) | |
| *B32B 15/18* | (2006.01) | |
| *B29C 65/46* | (2006.01) | |
| *B29C 65/00* | (2006.01) | |
| *B29C 65/02* | (2006.01) | |
| *B29C 65/14* | (2006.01) | |
| *B32B 15/14* | (2006.01) | |
| *B32B 15/02* | (2006.01) | |
| *B32B 15/20* | (2006.01) | |
| *B60R 13/00* | (2006.01) | |
| *B32B 15/04* | (2006.01) | |
| *B29C 70/00* | (2006.01) | |
| *B29C 70/74* | (2006.01) | |
| *B32B 3/16* | (2006.01) | |
| *B32B 3/18* | (2006.01) | |
| *B32B 15/085* | (2006.01) | |
| *B29L 31/30* | (2006.01) | |
| *B29K 623/00* | (2006.01) | |
| *B62D 29/00* | (2006.01) | |

(52) U.S. Cl.
CPC ............... *B29C 65/46* (2013.01); *B29C 66/71* (2013.01); *B29C 66/72326* (2013.01); *B29C 66/7315* (2013.01); *B29C 66/7394* (2013.01); *B29C 66/73111* (2013.01); *B29C 66/73751* (2013.01); *B29C 66/74283* (2013.01); *B29C 70/00* (2013.01); *B29C 70/747* (2013.01); *B32B 3/16* (2013.01); *B32B 3/18* (2013.01); *B32B 5/02* (2013.01); *B32B 5/022* (2013.01); *B32B 5/024* (2013.01); *B32B 5/028* (2013.01); *B32B 7/12* (2013.01); *B32B 7/14* (2013.01); *B32B 15/02* (2013.01); *B32B 15/043* (2013.01); *B32B 15/085* (2013.01); *B32B 15/14* (2013.01); *B32B 15/18* (2013.01); *B32B 15/20* (2013.01); *B60R 13/00* (2013.01); *B29C 66/1122* (2013.01); *B29C 66/3034* (2013.01); *B29C 66/5326* (2013.01); *B29C 66/61* (2013.01); *B29C 66/7212* (2013.01); *B29C 66/72141* (2013.01); *B29C 66/7352* (2013.01); *B29C 66/742* (2013.01); *B29K 2623/08* (2013.01); *B29K 2995/0082* (2013.01); *B29K 2995/0091* (2013.01); *B29L 2031/3005* (2013.01); *B29L 2031/3014* (2013.01); *B32B 2262/02* (2013.01); *B32B 2262/023* (2013.01); *B32B 2262/0223* (2013.01); *B32B 2262/0253* (2013.01); *B32B 2262/0261* (2013.01); *B32B 2262/0269* (2013.01); *B32B 2262/0276* (2013.01); *B32B 2262/0284* (2013.01); *B32B 2262/0292* (2013.01); *B32B 2262/062* (2013.01); *B32B 2262/101* (2013.01); *B32B 2262/106* (2013.01); *B32B 2264/02* (2013.01); *B32B 2264/101* (2013.01); *B32B 2307/30* (2013.01); *B32B 2307/50* (2013.01); *B32B 2307/546* (2013.01); *B32B 2307/56* (2013.01); *B32B 2605/08* (2013.01); *B62D 29/001* (2013.01); *Y10T 428/24826* (2015.01); *Y10T 428/24843* (2015.01)

(56) References Cited

U.S. PATENT DOCUMENTS

| | | |
|---|---|---|
| 4,397,914 A | 8/1983 | Miura et al. |
| 4,399,174 A | 8/1983 | Tanaka et al. |
| 4,830,908 A | 5/1989 | Nakajima et al. |
| 5,151,327 A | 9/1992 | Nishiyama et al. |
| 5,234,757 A | 8/1993 | Wong |
| 5,266,133 A | 9/1993 | Hanley et al. |
| 5,575,526 A | 11/1996 | Wycech |
| 5,708,042 A | 1/1998 | Hasegawa |
| 5,755,486 A | 5/1998 | Wycech |
| 5,766,719 A | 6/1998 | Rimkus |
| 5,932,680 A | 8/1999 | Heider |
| 6,131,897 A | 10/2000 | Barz et al. |
| 6,270,600 B1 | 8/2001 | Wycech |
| 6,287,666 B1 | 8/2001 | Wycech |
| H2047 H | 9/2002 | Harrison et al. |
| 6,455,146 B1 | 9/2002 | Fitzgerald |
| 6,506,494 B2 | 1/2003 | Brandys et al. |
| 7,125,461 B2 | 10/2006 | Czaplicki et al. |
| 7,144,071 B2 | 12/2006 | Le Gall et al. |
| 7,199,165 B2 | 4/2007 | Kassa et al. |
| 7,249,415 B2 | 7/2007 | Larsen et al. |
| 7,313,865 B2 | 1/2008 | Czaplicki et al. |
| 7,521,093 B2 | 4/2009 | Finerman et al. |
| 7,527,850 B2 | 5/2009 | Muto et al. |
| 7,784,186 B2 | 1/2010 | White et al. |
| 7,941,925 B2 | 5/2011 | Larsen et al. |
| 7,984,919 B2 | 7/2011 | Nitsche et al. |
| 8,002,332 B2 | 8/2011 | Coon et al. |
| 8,105,460 B2 | 1/2012 | Sheasley et al. |
| 8,181,327 B2 | 5/2012 | Apfel |
| 8,236,128 B2 | 8/2012 | Kassa et al. |
| 8,545,956 B2 | 10/2013 | Hoefflin |
| 9,708,013 B2 * | 7/2017 | Belpaire ............... B62D 29/002 |
| 2001/0036559 A1 | 11/2001 | Haack |
| 2002/0009582 A1 | 1/2002 | Golden |
| 2002/0096833 A1 | 7/2002 | Czaplicki et al. |
| 2003/0039792 A1 | 2/2003 | Hable et al. |
| 2003/0045620 A1 | 3/2003 | Carlson et al. |
| 2003/0124300 A1 | 7/2003 | Di et al. |
| 2003/0176128 A1 | 9/2003 | Czaplicki et al. |
| 2003/0183317 A1 | 10/2003 | Czaplicki et al. |
| 2004/0076831 A1 | 4/2004 | Hable et al. |
| 2004/0266898 A1 | 12/2004 | Kassa et al. |
| 2005/0166532 A1 | 8/2005 | Barz |
| 2005/0260399 A1 | 11/2005 | Finerman |
| 2007/0045866 A1 | 3/2007 | Gray et al. |
| 2007/0101679 A1 | 5/2007 | Harthcock et al. |
| 2008/0060757 A1 | 3/2008 | Hable et al. |
| 2008/0308212 A1 | 12/2008 | Sheasley et al. |
| 2009/0258217 A1 | 10/2009 | Hoefflin et al. |
| 2010/0021267 A1 | 1/2010 | Nitsche |
| 2010/0225017 A1 | 9/2010 | Nakagawa et al. |
| 2010/0259059 A1 | 10/2010 | Quaderer et al. |
| 2011/0236616 A1 | 9/2011 | Belpaire |
| 2011/0262735 A1 | 10/2011 | Hoefflin |
| 2012/0164358 A1 | 6/2012 | Schneider et al. |
| 2013/0216843 A1 | 8/2013 | Mase et al. |
| 2014/0134905 A1 | 5/2014 | Quaderer |

FOREIGN PATENT DOCUMENTS

| | | |
|---|---|---|
| CN | 103509506 A | 1/2014 |
| DE | 10163248 A1 | 7/2003 |
| DE | 102004046960 A1 | 4/2006 |
| DE | 10008018538 A1 | 10/2009 |
| EP | 0625559 B1 | 6/1998 |
| EP | 2409900 A1 | 1/2012 |
| EP | 3 152 048 B1 | 6/2019 |
| JP | 2003094475 A | 4/2003 |
| WO | 1995/025005 A1 | 9/1995 |
| WO | 1998/036944 A1 | 8/1998 |
| WO | 2000/046017 A1 | 8/2000 |
| WO | 2001/009404 A2 | 2/2001 |
| WO | 0109404 A2 | 2/2001 |
| WO | 2004/039577 A2 | 5/2004 |
| WO | 2004/078853 A2 | 9/2004 |
| WO | 2005/075189 A2 | 8/2005 |
| WO | 2005/077634 A2 | 8/2005 |
| WO | 2006/044414 A1 | 4/2006 |
| WO | 2007/019330 A1 | 2/2007 |

(56) References Cited

FOREIGN PATENT DOCUMENTS

| | | | |
|---|---|---|---|
| WO | 2007/140870 | A1 | 12/2007 |
| WO | 2008/014053 | A2 | 1/2008 |
| WO | 2011/134943 | A1 | 11/2011 |

OTHER PUBLICATIONS

Chemical Dictionary (Ma Sicang, p. 421, Shaanxi Science and Technology Press, Apr. 1999 (in Chinese)).
Chinese Office Action dated Jun. 3, 2016; Application No. 201380059665.3.
Chinese Second Office Action, Application No. 201380059665.3 dated Feb. 3, 2017.
Communication of a notice of opposition by Sika Technology AG, EP Application No. 13803328.7 (Patent No. EP2920046) dated May 23, 2018.
Communication Pursuant to Article 94(3) EPC, Application No. 13803328.7 dated Jul. 26, 2016.
Co-pending U.S. Appl. No. 13/804,840, filed Mar. 14, 2013, Application and Drawings (21 pages) included.
Co-pending U.S. Appl. No. 61/705,857, filed Sep. 26, 2012, Application and Drawings (23 pages) included.
Co-pending U.S. Appl. No. 61/837,832, filed Jun. 23, 2013 Application and Drawings (32 pages) included.
Copening U.S. Appl. No. 13/924,827, filed Jun. 24, 2013.
Extened European Search Report for Application No. 17184916.9 dated Nov. 30, 2017.
International Preliminary Report on Patentability dated May 28, 2015 dated Apr. 9, 2014; Appln. No. PCT/US2013/070059.
International Search Report & Written Opinion dated Apr. 9, 2014; Appln. No. PCT/US2013/070059.
PCT International Search Report and Written Opinion, PCT/US2013/031343, dated Jun. 6, 2013.
PCT International Search Report and Written Opinion, PCT/US2013/047484, dated Jan. 15, 2014.
Notice of Opposition for European Application 13803328.7, dated Sep. 5, 2018.
Summons to Attend Oral Proceedings for European Application 13803328.7, dated Dec. 12, 2018.

* cited by examiner

US 10,780,672 B2

LOCALIZED PANEL STIFFENER

TECHNICAL FIELD

The present teachings relate generally to a reinforcement member that includes a matrix material and a carrier material.

BACKGROUND

The automotive industry is emphasizing efforts to reduce overall vehicle weight in order to obtain improved fuel efficiency. One common way to reduce vehicle weight is to reduce the thickness of the sheet metal. Frequently, the areas of the vehicle that form vehicle closures will be made with a thinner gauge metal. These vehicle closures include doors, trunks, hoods and liftgates. One area of particular interest is with vehicle doors. The thickness of the metal used for doors is sufficiently thin such that it is highly susceptible to buckling from even the smallest amounts of pressure. To prevent such buckling, localized stiffness in selected areas of the door is increased by the use of thermosetting panel stiffeners. These panel stiffeners are typically glass reinforced with an epoxy matrix. However, as the gauge of metal continues to thin, these typical panel stiffeners are causing the thin metal to deform (commonly referred to as read-through). Therefore there is a need for an improved panel stiffener that provides stiffness to thin sheet metal yet does not result in deformation of the metal.

SUMMARY OF THE INVENTION

In a first aspect the present teachings contemplate a device comprising a carrier material and a matrix material deposited onto the carrier material in a pattern that leaves a predetermined amount of space between each deposition of matrix material.

Each deposition of matrix material may be at least about 0.5 mm in diameter and less than about 10 mm in diameter. The device may be flexible (e.g., capable of easily bending without breaking). The device may bend under its own weight when held at its end. The matrix material may be an activatable material and the volumetric activation of the matrix material is at least about 100% and less than about 300%. The matrix material may include a structural adhesive material. The matrix material may include a sealant material. Each deposition of matrix material may be at least about 1 mm in diameter and less than about 4 mm in diameter. The carrier may be free of any sharp corners and includes only rounded corners. The predetermined amount of space between each deposition of matrix material may be at least about 0.5 mm, at least about 1 mm, at least about 2 mm or even at least about 5 mm. The device may include an elastic material deposited onto the carrier material in a pattern that leaves a predetermined amount of space between each deposition of elastic material. The matrix material and the elastic material may be deposited in an alternating pattern onto the carrier.

The teachings herein further provide for a device comprising a carrier material and a matrix material deposited onto the carrier material and intended for direct contact with a sheet metal surface, wherein the coefficient of thermal expansion of the matrix material is substantially the same as the coefficient of thermal expansion of the sheet metal.

The sheet metal may be steel. The coefficient of thermal expansion may be at least about $5 \times 10^{-6}$ m/mK. The coefficient of thermal expansion may be at least about $10 \times 10^{-6}$ m/mK.

The teachings herein contemplate a device for the structural reinforcement of body stampings with a matrix material and associated carrier, whereby the matrix material is deposited in a pattern with spaces in between the depositions of matrix material. The device disclosed herein may allow for effective reinforcing of a panel while producing substantially no deformation of the panel.

DETAILED DESCRIPTION

Figure 1:
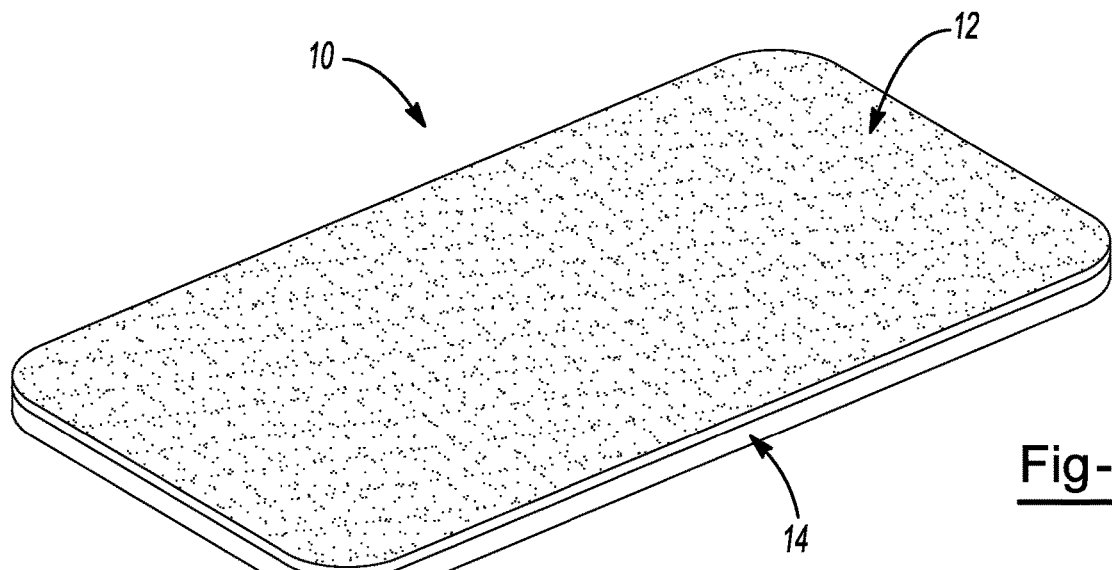
FIG. 1 shows a top-down view of an illustrative example of a device in accordance with the present teachings.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of the filing date of U.S. Provisional Application No. 62/161,523, filed May 14, 2015; and U.S. Provisional Application No. 62/164,224, filed May 20, 2015, the contents of these applications being hereby incorporated by reference for all purposes.

The devices described herein include a carrier and a matrix material deposited thereon. The nature of both the carrier and the matrix material are such that they can be easily applied to a very thin gauge metal part while avoiding read-through on the surface (e.g., a class-A surface) of the metal part. The spaces in between the depositions of matrix material are integral to avoiding read-through, in that if the matrix material were to be applied as a full sheet onto a thin gauge metal part (e.g., in a constant sheet with no spaces in between) the activation of the matrix material would likely result in read-through.

The matrix material may be located onto only one surface of the carrier. The device may thus be incapable of bonding two surfaces together. The device may be formed as a patch for providing localized stiffness to a metallic panel.

The matrix material may be located onto the carrier in any shape or pattern such that predetermined spaces exist between each deposition of matrix material. The matrix material may be deposited in plots, which may have rounded edges. The sizes of the plots may be consistent or may vary along the carrier. The matrix material may be deposited in strips, where the distance between each strip may be consistent along the carrier. Alternatively, the distance between each strip may be vary along the carrier. The strips may all be deposited in one direction such that the strips run parallel to one another. The strips may be deposited such that a first strip may be located in a skew or even a perpendicular relationship with a second strip. The carrier may include a single deposition of matrix material or a plurality of depositions of matrix material.

The matrix material of the present invention may be an epoxy-based material and may be activatable to form an epoxy-based adhesive material upon activation. The matrix material may be at least partially tacky at room temperature (e.g., about 23° C.) and may also be tacky at temperatures between about 0° C. and about 80° C. The matrix material may alternatively be dry to the touch at room temperature. Additionally, the matrix material preferably exhibits reinforcement characteristics (e.g., imparts rigidity, stiffness, strength or a combination thereof to a member upon which it is located). It is also preferable for the matrix material to be activated (by heat, UV light, induction heating, or the like) to expand or otherwise activate and wet surfaces which the matrix material contacts. After activation (which may or may not include expansion), the matrix material preferably cures, hardens and adheres to the surfaces that it contacts. For application purposes, it is often preferable that the matrix material exhibit flexibility, particularly when the matrix material is to be applied to a contoured surface of a vehicle body. Once applied, however, it is typically preferable for the matrix material to be activatable to soften, expand (e.g., foam), cure, harden or a combination thereof. For example, and without limitation, a typical matrix material will include a polymeric material, such as an epoxy resin or ethylene-based polymer which, when compounded with appropriate ingredients (typically a blowing and curing agent), expands and cures in a reliable and predicable manner upon the application of heat or the occurrence of a particular ambient condition. From a chemical standpoint for a thermally-activated material, the matrix material may be initially processed as a flowable material before curing. Thereafter, the material preferably cross-links upon curing, which makes the material substantially incapable of further flow.

The epoxy may be aliphatic, cycloaliphatic, aromatic or the like. The epoxy may be supplied as a solid (e.g., as pellets, chunks, pieces or the like) or a liquid. The epoxy may include an ethylene copolymer or terpolymer that may possess an alpha-olefin. As a copolymer or terpolymer, the polymer is composed of two or three different monomers, i.e., small molecules with high chemical reactivity that are capable of linking up with similar molecules. One exemplary epoxy resin may be a phenolic resin, which may be a novalac type or other type resin. Other preferred epoxy containing materials may include a bisphenol-A epichlorohydrin ether polymer, or a bisphenol-A epoxy resin which may be modified with butadiene or another polymeric additive. Examples of suitable epoxy-based materials, which may be used as in the matrix material are sold under the product designations L5020, L5010, L5224, L8000, L5001 and are commercially available from L&L Products, Romeo, Mich. According to preferred formulations, the base material can include up to about 50% by weight epoxy resins, more preferably, up to about 65% by weight epoxy resins, and even more preferably up to about 80% by weight epoxy resins.

Advantageously, the matrix material of the present invention may be formed or otherwise processed in a variety of ways. For example, preferred matrix materials can be processed by injection molding, extrusion, compression molding or with a robotically controlled extruder such as a mini-applicator. A controlled extruder may allow for precise placement of one or more of the matrix material and elastic material.

The elastic material may be a material that provides vibration damping to the sheet metal. The elastic material may also be an activatable and may be capable of expansion, similar to the matrix material.

The matrix material and/or the elastic material may be formulated to have a desired coefficient of thermal expansion. This coefficient of thermal expansion may be selected so that it is similar to that of a metal to which the matrix material will be applied during use of the device. A filler material may be specifically selected to assist in matching the coefficient of thermal expansion of the matrix material to that of the sheet metal.

The carrier material for receiving the matrix material may be a glass material (e.g., a fiberglass material), which may be a glass mesh material. The carrier may include non-conductive threads or wire (e.g., elongated filament, fibrous, or fabric material), which may be applied as a mat, a cloth, a roving, a netting, a mesh, a scrim, or the like. In such embodiments, the carrier material may be composed, for example, of woven or unwoven fibers, filaments or the like of cotton, glass (e.g., E-glass or S-glass), fiberglass, Mylar, nylon, polyester, carbon, aramid, plastics, polymers (e.g., thermoplastics such as polyamides (e.g., nylon), PET (e.g., Mylar), polycarbonate, polyethylene, polypropylene, polybutylene (e.g., polybutylene terephthalate), polystyrene, polyurethane, vinyl, or any combination thereof, or other materials. As used herein, "threads," or "wire" connotes a single filament of material, a braided bundle of filaments, or an unbraided bundle of filaments. The carrier material may be aluminum. The carrier may comprise a metallic material. The carrier may be substantially thicker than any film material. The carrier may be free of any film material. The carrier may be substantially rigid or may have a minimal amount of flexibility. The carrier may be less flexible than a film material.

In other applications, it may appreciable that the mesh material may be bead-like particles, aggregates, hollow material (e.g., hollow particle), or otherwise, or any combination thereof. In such embodiments, the strengthening material may be composed, for example, of particles or the like of glass (e.g., E-glass or S-glass), fiberglass, nylon, polyester, carbon, aramid, plastics, polymers (e.g., thermoplastics such as polyamides (e.g., nylon), polycarbonate, polyethylene, polypropylene, polybutylene (e.g., polybutylene terephthalate), polystyrene, polyurethane, vinyl, or any combination thereof), or other materials.

FIG. 1 shows the device 10 having a matrix material 12. A carrier 14 is located in planar contact with the matrix material layer 12. The carrier 14 and matrix material 12 are formed having curved corners 16.

Figure 2:
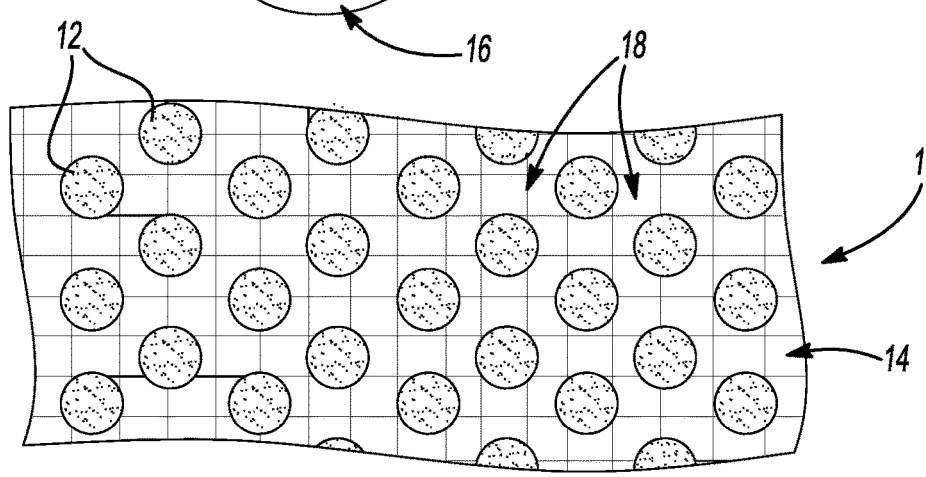
FIG. 2 shows a top-down view of an illustrative example of a device in accordance with the present teachings.

FIG. 2 shows the device 10 including a carrier 14 having a plurality of portions of matrix material 12 deposited onto the carrier. A plurality of spaces 18 are located in between the matrix material 12.

Figure 3:
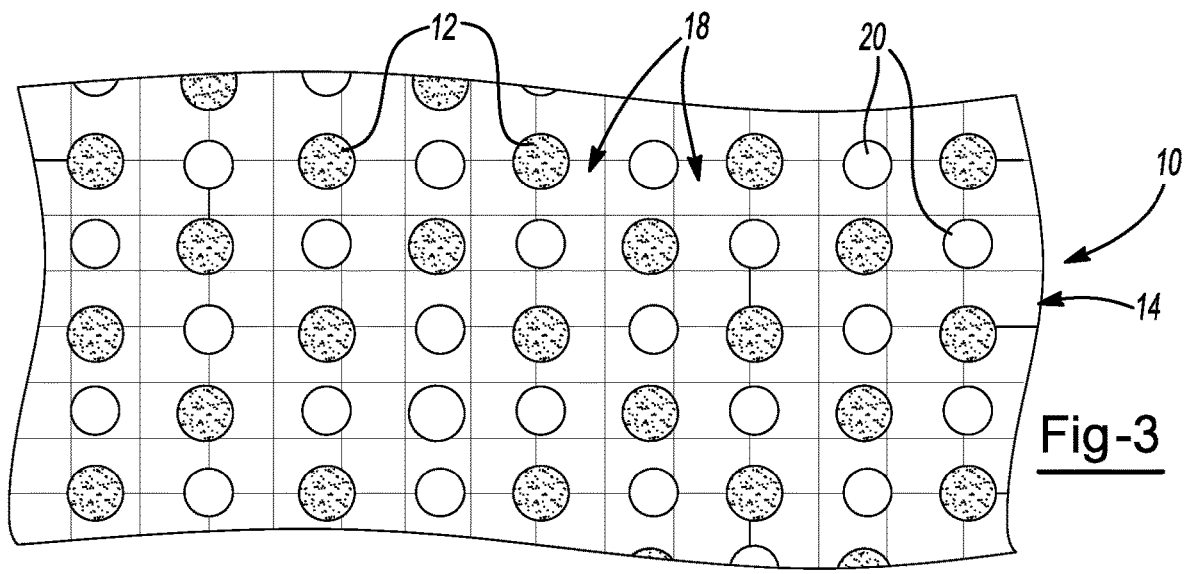
FIG. 3 shows a top-down view of an illustrative example of a device in accordance with the present teachings.

FIG. 3 shows the device 10 including a carrier 14 having a plurality of portions of matrix material 12 deposited onto the carrier and also a plurality of portions of elastic material 20 deposited onto the carrier. A plurality of spaces 18 are located in between the matrix material 12 and the elastic material 20.

Figure 4:
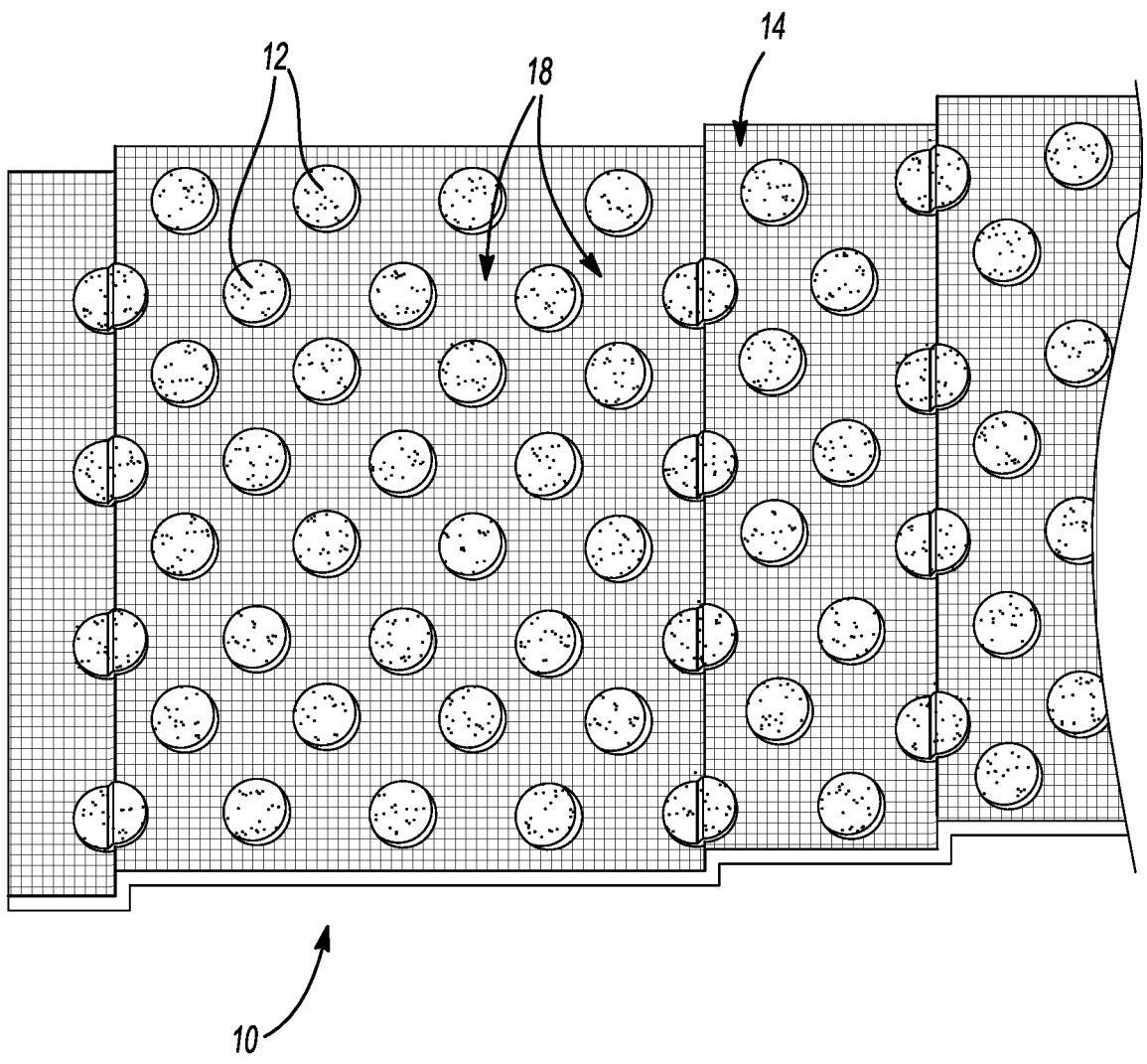
FIG. 4 shows a top-down view of an illustrative example of a device in accordance with the present teachings.

FIG. 4 shows the device 10 including a carrier 14 having a plurality of portions of matrix material 12 deposited onto the carrier. A plurality of spaces 18 are located in between the matrix material 12.

Figure 5:
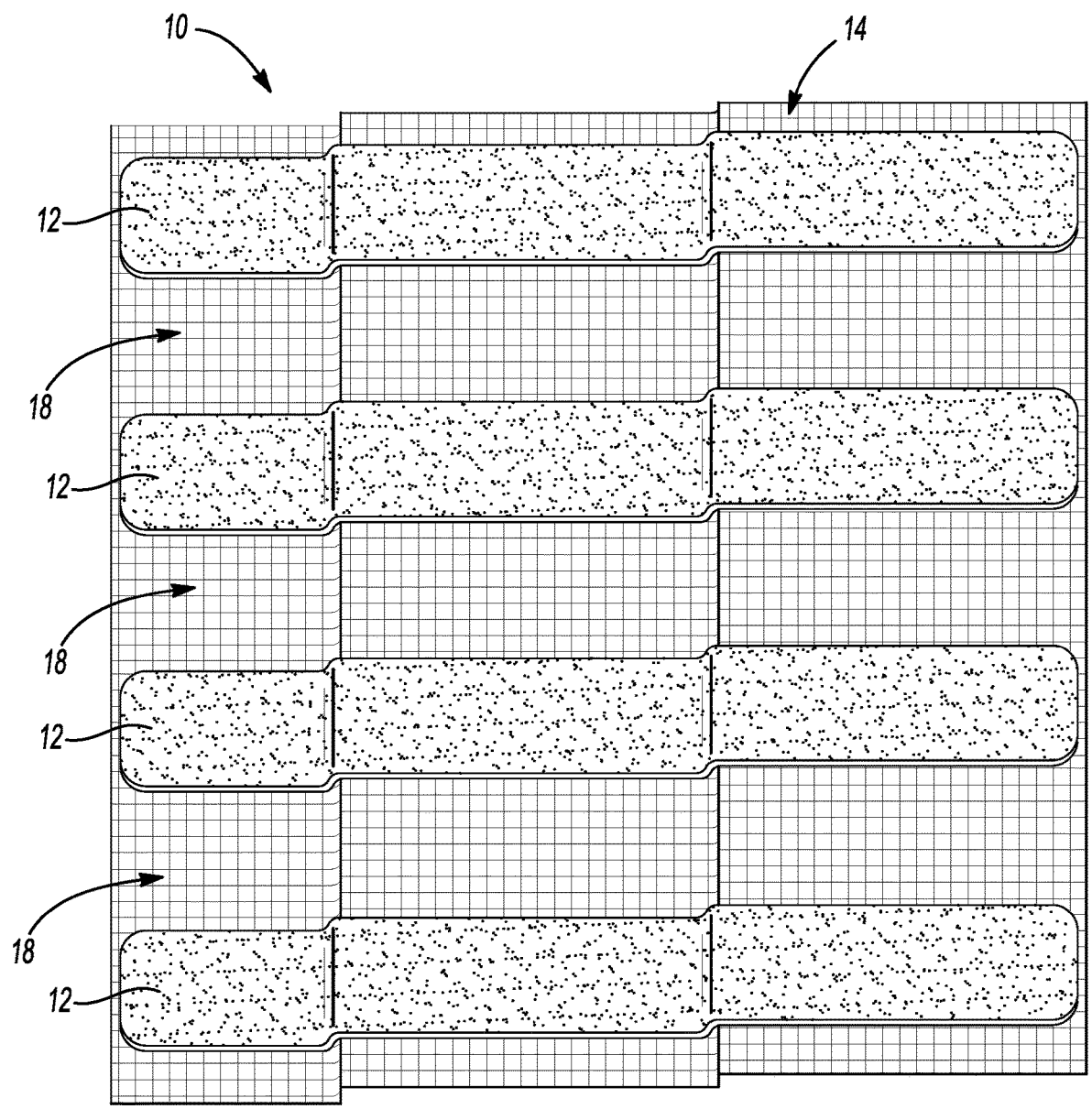
FIG. 5 shows a top-down view of an illustrative example of a device in accordance with the present teachings.

FIG. 5 shows the device 10 including a carrier 14 having a plurality of portions of matrix material 12 deposited in substantially straight lines onto the carrier. A plurality of spaces 18 are located in between the matrix material 12.

The devices disclosed herein provide added stiffness for thin gauge metal panels without the issues related to read-through. Read-through issues are substantially avoided by providing spaces in between depositions of activatable material. Issues are further avoided by providing carriers with curved edges (e.g., carriers that are substantially free of any corners having right (or near right angles). The devices are preferably formed having matrix material on only one surface of the carrier. The depositions of matrix material may be substantially less than full coverage of a carrier.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A device comprising:
a carrier material, wherein the carrier material is free of any sharp corners and includes only rounded corners, and wherein the carrier material is a glass material including a plurality of openings;
a matrix material deposited onto the carrier material in a pattern that leaves a predetermined amount of space between each deposition of matrix material;
wherein each deposition of matrix material is at least about 0.5 mm in diameter a d less than about 10 mm in diameter;
wherein the device will bend under its own weight when held at its end; and
wherein the matrix material is only deposited on one surface of the carrier material.

2. The device of claim 1, wherein the device is capable of easily bending without breaking.

3. The device of claim 1, wherein the matrix material is an activatable material and the volumetric activation of the matrix material is at least about 100% and less than about 300%.

4. The device of claim 1, wherein the matrix material includes a structural adhesive material.

5. The device of claim 1, wherein the matrix material includes a sealant material.

6. The device of claim 1, wherein each deposition of mat material is at least about 1 mm in diameter and less than about 4 mm in diameter.

7. The device of claim 1, wherein the predetermined amount of space between each deposition of matrix material is at least about 0.5 mm, at least about 1 mm, at least about 2 mm or even at least about 5 mm.

8. The device of claim 1, including an elastic material deposited onto the carrier material in a pattern that leaves a predetermined amount of space between each deposition of elastic material.

9. The device of claim 8, wherein the matrix material and the elastic material are deposited in an alternating pattern onto the carrier material.

10. The device of claim 1, wherein the carrier material is substantially free of any film material.

11. A device comprising
a carrier material, wherein the carrier material is free of any sharp corners and includes only rounded corners;
a matrix material deposited onto the carrier material and intended for direct contact with a sheet metal surface;

wherein the coefficient of thermal expansion of the matrix material is substantially the same as the coefficient of thermal expansion of the sheet metal;
wherein the device will bend under its own weight when held at its end; and
wherein the matrix material is only deposited on one surface of the carrier material.

12. The device of claim 11, wherein the sheet metal is steel.

13. The device of claim 11, wherein the coefficient of thermal expansion is at least about $5 \times 10^{-6}$ m/mK.

14. The device of claim 11, wherein the coefficient of thermal expansion is at least about $10 \times 10^{-6}$ m/mK.

15. The device of claim 11, wherein the carrier material is substantially free of any film material.

16. The device of claim 1, wherein the matrix material includes an ethylene-based copolymer.

17. The device of claim 11, wherein the matrix material includes an ethylene-based copolymer.

18. The device of claim 11, wherein the carrier material is a glass material including a plurality of openings.

19. The device of claim 11, wherein the matrix material is an activatable material and the volumetric activation of the matrix material is at least about 100% and less than about 300%.

20. The device of claim 11, wherein the matrix material includes a structural adhesive material.

* * * * *

UNITED STATES PATENT AND TRADEMARK OFFICE
CERTIFICATE OF CORRECTION

PATENT NO. : 10,780,672 B2
APPLICATION NO. : 15/573334
DATED : September 22, 2020
INVENTOR(S) : Keith Madaus et al.

Page 1 of 1

It is certified that error appears in the above-identified patent and that said Letters Patent is hereby corrected as shown below:

In the Claims

Column 6, Line 31, Claim 1 delete "in diameter a d less" and insert --in diameter and less--

Column 6, Line 47, Claim 6 delete "deposition of mat" and insert --deposition of matrix--

Signed and Sealed this
Third Day of November, 2020

Andrei Iancu
*Director of the United States Patent and Trademark Office*